(12) United States Patent
Manahan et al.

(10) Patent No.: US 8,844,749 B2
(45) Date of Patent: Sep. 30, 2014

(54) FASTENING DEVICES FOR EXPLOSION-PROOF ENCLOSURES

(71) Applicants: Joseph Michael Manahan, Manlius, NY (US); Yabin Zhao, Liverpool, NY (US)

(72) Inventors: Joseph Michael Manahan, Manlius, NY (US); Yabin Zhao, Liverpool, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/794,402

(22) Filed: Mar. 11, 2013

(65) Prior Publication Data

US 2014/0076901 A1 Mar. 20, 2014

Related U.S. Application Data

(60) Provisional application No. 61/701,208, filed on Sep. 14, 2012.

(51) Int. Cl.
*B65D 45/24* (2006.01)
*E05C 19/14* (2006.01)
*B65D 43/22* (2006.01)
*B65D 43/26* (2006.01)
*H02K 5/00* (2006.01)

(52) U.S. Cl.
CPC ............... *B65D 43/22* (2013.01); *B65D 43/26* (2013.01); *B65D 45/24* (2013.01); *H02K 5/00* (2013.01); *Y10S 292/11* (2013.01)
USPC ............ 220/325; 220/324; 292/100; 292/95; 292/198; 292/200; 292/DIG. 11

(58) Field of Classification Search
CPC ............ E05C 3/02; E05C 3/06; B65D 45/00; B65D 45/02; B65D 45/10; B65D 45/24; B65D 45/20; B65D 45/16; B65D 90/325
USPC ......... 220/238, 315, 316, 319, 320, 321, 324, 220/325; 215/284; 292/256, 194, 195, 198, 292/200, 95, 96, 100, DIG. 11, 256.75
See application file for complete search history.

(56) References Cited

U.S. PATENT DOCUMENTS 1,482,049 A * 1/1924 Swanson ................ 220/321
1,836,949 A 12/1931 Balough
(Continued)

FOREIGN PATENT DOCUMENTS

EP 0346290 12/1989
EP 1970604 9/2008
(Continued)

*Primary Examiner* — Fenn Mathew
*Assistant Examiner* — James N Smalley
(74) *Attorney, Agent, or Firm* — King & Spalding LLP

(57) ABSTRACT

A fastening device for fastening a cover to a body of an explosion-proof enclosure can include a bracket having a back side mechanically coupled to a bottom side at a first angle and to a top side at a second angle, where the top side includes an engagement portion, where the first angle is substantially parallel to an under side of the body flange, and where the second angle is substantially parallel to a top side of the cover flange. The fastening device can also include a cam fixedly coupled to an outer surface of the cover flange and hingedly coupled to the engagement portion. The fastening device can further include a lever fixedly coupled to the cam and having a closed position and an open position.

22 Claims, 11 Drawing Sheets

(56) References Cited

U.S. PATENT DOCUMENTS

| | | | |
|---|---|---|---|
| 2,360,826 A | 10/1944 | Cherry | |
| 3,360,155 A * | 12/1967 | Colonna | 220/325 |
| 3,416,823 A | 12/1968 | Auer | |
| 3,901,122 A | 8/1975 | Novotny | |
| 3,910,155 A | 10/1975 | Wilson | |
| 3,974,933 A | 8/1976 | Toth et al. | |
| 4,059,199 A | 11/1977 | Quaney | |
| 4,139,118 A | 2/1979 | Parker | |
| 4,157,146 A * | 6/1979 | Svenson | 220/324 |
| 4,233,697 A | 11/1980 | Cornwall | |
| 4,656,793 A | 4/1987 | Fons | |
| 4,664,281 A | 5/1987 | Falk et al. | |
| 4,902,046 A | 2/1990 | Maloberti | |
| 5,004,129 A | 4/1991 | Loch et al. | |
| 5,322,178 A | 6/1994 | Foos | |
| 5,346,090 A | 9/1994 | Purohit et al. | |
| 5,399,052 A | 3/1995 | Volkmann et al. | |
| 5,657,892 A | 8/1997 | Bolli et al. | |
| 5,785,449 A | 7/1998 | Dibene | |
| 5,888,140 A | 3/1999 | Klingler et al. | |
| 6,769,850 B2 | 8/2004 | Lay | |
| 6,938,385 B2 | 9/2005 | Lind | |
| 7,877,948 B2 | 2/2011 | Davies | |
| 2011/0131898 A1 | 6/2011 | Nies et al. | |
| 2012/0160052 A1 | 6/2012 | Manahan et al. | |

FOREIGN PATENT DOCUMENTS

| | | |
|---|---|---|
| JP | 08026314 | 1/1996 |
| JP | 08-233108 | 9/1996 |
| JP | 0932923 | 2/1997 |
| JP | 10-101108 | 4/1998 |
| JP | 2008105746 | 5/2008 |
| JP | 4847646 | 10/2011 |
| WO | 2011084152 | 7/2011 |

* cited by examiner

FASTENING DEVICES FOR EXPLOSION-PROOF ENCLOSURES

CROSS-REFERENCE TO RELATED APPLICATION

This application claims priority under 35 U.S.C. §119 to U.S. Provisional Patent Application Ser. No. 61/701,208, titled "Fastening Devices for Explosion-Proof Enclosures" and filed on Sep. 14, 2012, the entire contents of which are hereby incorporated herein by reference.

The present application is further related to U.S. patent application Ser. No. 13/793,672, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/793,774, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,433, titled "Cover Release Mechanisms for Enclosures," which is being filed concurrently with the U.S. Patent and Trademark Office, and whose entire contents are hereby incorporated herein by reference.

The present application is further related to World Intellectual Property Organization (WIPO) Patent Application Serial Number WO2011/084152, titled "Enclosure Clamps and Clamp Systems," filed on Jan. 5, 2010, and whose entire contents are hereby incorporated herein by reference.

TECHNICAL FIELD

The present disclosure relates generally to explosion-proof enclosures, and more particularly to systems, methods, and devices for securing a cover of an explosion-proof enclosure to a body of the explosion-proof enclosure.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries, petrochemical plants, and other harsh environments. At times, the equipment located inside such explosion-proof receptacle housing and enclosure systems is used to control motors and other industrial equipment.

In order for an explosion-proof enclosure to meet certain standards and requirements, the cover of the enclosure must be sealed to the body of the enclosure within certain, tolerances. Often, this requires a large number (30 or more) of bolts to be tightened. Consequently, securing all of the bolts at the appropriate torque is a very time-consuming process. In addition, removing all of the bolts to access one or more components inside the explosion-proof enclosure is a time-consuming process. Further, if all of the bolts are not reinserted and properly torqued, insufficient sealing can result, thereby creating a point of environmental ingress and/or loss of explosion-proof integrity.

SUMMARY

In general in one aspect, the disclosure relates to a fastening device for fastening a cover to a body of an explosion-proof enclosure. The fastening device can include a bracket having a back side mechanically coupled to a bottom side at a first angle and to a top side at a second angle, where the top side has an engagement portion, where the first angle is substantially parallel to an under side of a flange, and where the second angle is substantially parallel to a top side of an opposing flange. The fastening device can also include a cam fixedly coupled to an outer surface of the opposing flange and hingedly coupled to the engagement portion. The fastening device can further include a lever fixedly coupled to the cam and having a closed position and an open position. The bracket can engage the opposing flange and the flange when the lever is in the closed position. The bracket can be disengaged from the opposing flange and the flange when the lever is in the open position.

In another aspect, the disclosure can generally relate to an enclosure. The enclosure can include a first enclosure portion having a flange. The enclosure can also include a second enclosure portion mechanically coupled to the first enclosure portion and having a opposing flange, where the opposing flange has a flange relief feature disposed along a distal end of the opposing flange and a proximal end of a normal portion of the opposing flange. The enclosure can further include a fastening device mechanically coupled to an outer surface of the first enclosure portion. The fastening device of the enclosure can include a bracket having a back side mechanically coupled to a bottom side at a first angle and to a top side at a second angle, where the top side has an engagement portion, where the first angle is substantially parallel to an under side of the opposing flange, and where the second angle is substantially parallel to a top side of the flange. The fastening device of the enclosure can also include a cam fixedly coupled to the outer surface of the flange and hingedly coupled to the engagement portion. The fastening device of the enclosure can further include a lever fixedly coupled to the cam and having a closed position and an open position. The bracket can engage the flange and the opposing flange when the lever is in the closed position. The bracket can be disengaged from the flange and the opposing flange when the lever is in the open position.

In yet another aspect, the disclosure can generally relate to an enclosure. The enclosure can include a first enclosure portion comprising a flange. The enclosure can also include a second enclosure portion mechanically coupled to the first enclosure portion and having an opposing flange, where the opposing flange has a flange relief feature disposed along a distal end of the opposing flange and a normal portion disposed along a proximal end of the opposing flange. The enclosure can further include at least one fastening device that mechanically couples the first enclosure portion to the second enclosure portion. The normal portion of the opposing flange can be mechanically coupled to a portion of the flange. The distal end of the opposing flange and a remainder of the flange can form a cavity defined by the flange relief feature.

In yet another aspect, the disclosure can generally relate to an enclosure. The enclosure can include a first enclosure portion having a first flange and at least one mounting support. The enclosure can also include a second enclosure portion mechanically coupled to the first enclosure portion and having a second flange. The enclosure can further include at least one fastening device mechanically coupled to the at least one mounting support. The at least one fastening device can include a bracket having a back side mechanically coupled to a bottom side at a first angle and to a top side at a second angle, where the top side includes an engagement portion, where the first angle is substantially parallel to an under side of the first flange, and where the second angle is substantially parallel to a top side of the second flange. The at least one fastening device can also include a hinged coupling feature hingedly coupled to the at least one mounting support and fixedly coupled to the bracket. The at least one fastening device can further include a handle fixedly coupled to the hinged coupling feature and having a closed position and an open position. The bracket can engage the first flange and the second flange when the lever is in the closed position. The bracket can be disengaged from the first flange and the second flange when the lever is in the open position.

These and other aspects, objects, features, and embodiments will be apparent from the following description and the appended claims.

BRIEF DESCRIPTION OF THE DRAWINGS

The drawings illustrate only example embodiments of fastening devices for explosion-proof enclosures and are therefore not to be considered limiting of its scope, as fastening devices for explosion-proof enclosures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
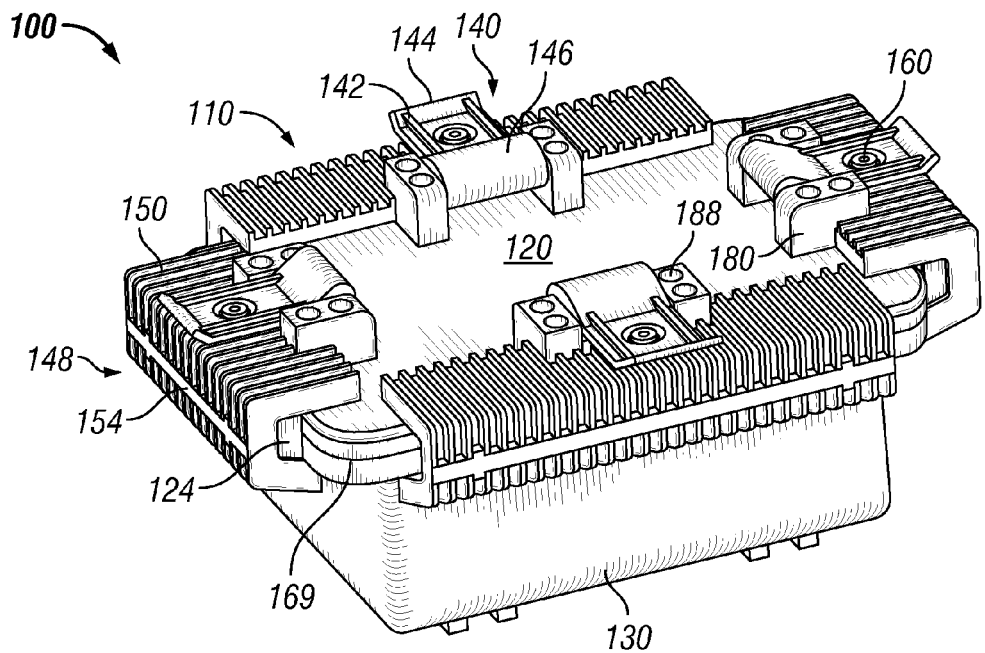
FIGS. 1A-E show various views of an explosion-proof enclosure with example fastening devices in accordance with certain example embodiments.
Figure 1B:
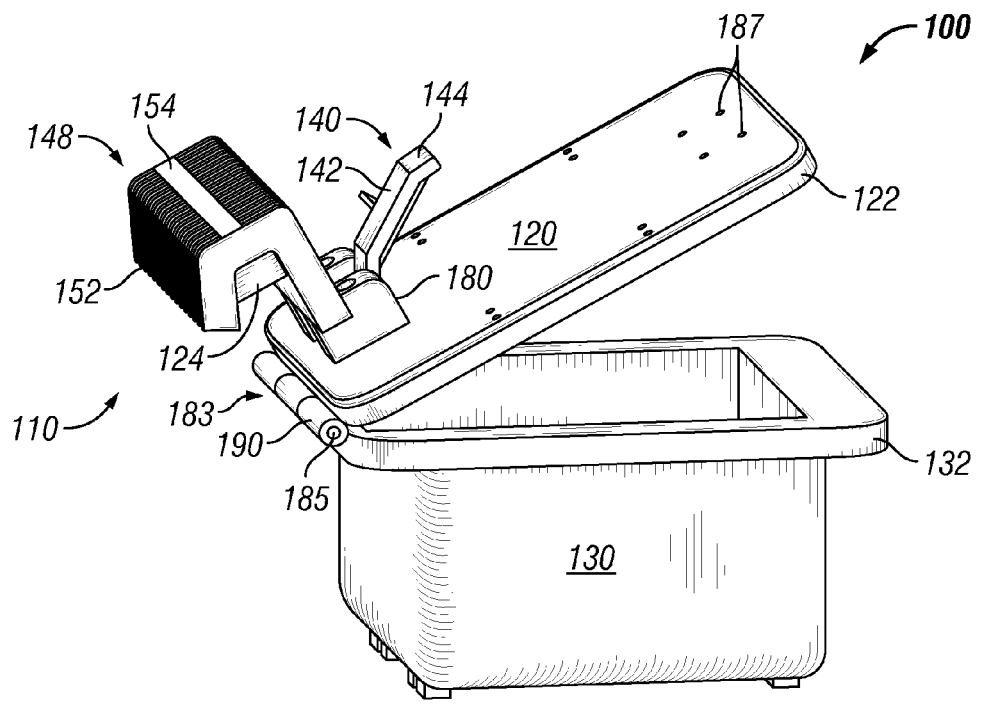

The example embodiments discussed herein are directed to systems, apparatuses, and methods of fastening a cover of an explosion-proof enclosure to a body of the explosion-proof enclosure. While the example embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure (e.g., flame-proof enclosure) may be used in conjunction with example embodiments of fastening devices.

As used herein, the cover and the body of an enclosure can be referred to as enclosure portions. Further, while example fastening devices are shown in the accompanying figures as being mechanically coupled to the cover of an enclosure, example fastening devices can, additionally or alternatively, be mechanically coupled to the body of the enclosure. Similarly, while example flange relief features are shown being disposed on the body, example flange relief features can, additionally or alternatively, be disposed on the cover.

In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply, for example, a NEMA Type 7 standard applies to enclosures constructed for indoor use in certain hazardous locations. Hazardous locations may be defined by one or more of a number of authorities, including but not limited to the National Electric Code (e.g., Class 1, Division 1) and Underwriters' Laboratories, inc. (UL) (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Some standards also require that one or more tools are used to open an explosion-proof enclosure. Example embodiments described herein require the use of a tool, whether custom made or standard, to disengage the fastening device and open the explosion-proof enclosure. Each of the components of the example fastening devices (e.g., fastener, fastener receiver, load distributing member, handle, cam, pin) can be made from one or more of a number of suitable materials, including but not limited to stainless steel, plastic, aluminum, ceramic, rubber, and iron.

Example enclosures described herein can be exposed to one or more environments (e.g., hazardous, corrosive, high temperature, high humidity) that can cause the enclosure cover and the enclosure body to become fused together to some extent. In such a case, example cover release mechanisms can be used to assist in plying apart the enclosure cover from the enclosure body. For example, such a cover release mechanism can be useful when oxidation has formed between the cover flange and the body flange. In such a case, an improper method of prying apart the enclosure cover and the enclosure body can result in damage (e.g., scoring, pitting, gouging) to the cover flange and/or the body flange. Examples of cover release mechanisms can be found in U.S. patent application Ser. No. 13/794,433, entitled "Cover Release Mechanisms for Enclosures." the entire contents of which are hereby incorporated by reference, and that is being filed concurrently with the U.S. Patent and Trademark Office.

Example embodiments of fastening devices for explosion-proof enclosures will be described more folly hereinafter with reference to the accompanying drawings, in which example embodiments of fastening devices for explosion-proof enclosures are shown. Fastening devices for explosion-proof enclosures may, however, be embodied in many different forms and should not be construed as limited to the example embodiments set forth herein. Rather, these example embodiments are provided so that this disclosure will be thorough and complete, and will fully convey the scope of fastening devices for explosion-proof enclosures to those or ordinary skill in the art. Like, but not necessarily the same, elements (also sometimes called components) in the various figures are denoted by like reference numerals for consistency.

FIGS. 1A-E show various views of an explosion-proof enclosure 100 with example fastening devices 110 in accordance with certain example embodiments. These and other components of the explosion-proof enclosure 100 with example fastening devices 110 of FIG. 1 are described below. Example embodiments are not limited to the configuration shown in FIG. 1 and discussed herein.

The explosion-proof enclosure 100 includes an enclosure cover 120 and a cover flange 122 around the outer perimeter of the enclosure cover 120. The cover flange 122 is mated to a body flange 132 that is positioned around the perimeter of the enclosure body 130. One or more hinges 183 may be positioned along one or more sides of the enclosure cover 120 and a corresponding side of the enclosure body 130 (sometimes called a body 130 an enclosure portion). Alternatively, there may be no hinges 183 coupling the enclosure cover 120 to the enclosure body 130. In such a case, the enclosure cover 120 can be completely separated from the enclosure body 130 when the enclosure cover 120 is not fastened to the enclosure body 130.

Each hinge 183 can include one or more hinge members 190. The hinge members 190 are mechanically (fixedly) coupled to a lower surface of the cover flange 122 and/or an upper surface of the base flange 132. The distal end of the hinge member 190 can be fixedly and/or removably coupled to the lower surface of the cover flange 122 and/or an upper surface of the base flange 132. In addition, the hinge members 190 are hingedly coupled to each other.

In certain example embodiments, a coupling member 195 is used to hingedly couple the hinge members 190 together. For example, a hinge 183 can have one hinge member 190 fixedly coupled (using, for example, screws that traverse an aperture in the distal end of the hinge member 190 as well as a corresponding aperture in the cover flange 122) to the cover flange 122, and another complementary hinge member 190 fixedly coupled, to the body flange 132. A tubular aperture can traverse the length of the proximal end of both of the hinge members 190, and the two hinge members 190 can be joined by inserting a coupling member 195 (for example, a pin) into the apertures. The coupling member 195 maintains the hinged coupling between the hinge members 190.

When, one or more hinges 183 are positioned along one or more sides of the enclosure cover 120 and a corresponding side of the enclosure body 130, the hinges can be positioned within one or more slots in the enclosure cover 120 and/or in the enclosure body 130. Specifically, one or more slots can be disposed in the cover flange 122 and/or in the body flange 132. For example, as shown in FIGS. 1C-E, the cover flange 122 has a vertical slot 172 and a horizontal slot 170 that correspond to a vertical slot 176 and a horizontal slot 174 in the body flange 132. There can be one or more apertures, slots, mating threads, and/or other features in the cover flange 122 and/or the body flange 132 that are used to receive and couple to (removably, fixedly) one or more hinge members 190.

In addition, or in the alternative, the hinge members 190 can be mechanically coupled to the lower surface of the cover flange 122 and/or an upper surface of the base flange 132 using one or more other fastening methods, including but not limited to welding, integrated construction of the cover flange 122 and/or body flange 132, and compression fittings. Regardless of how the hinge members 190 are coupled to the cover flange 122 and/or the base flange 132, the hinge 183 is protected from destructive elements and/or forces to which the explosion-proof enclosure 100 is exposed because the hinge 183 is located inside (underneath) the U-shaped bracket 148.

Figure 1C:
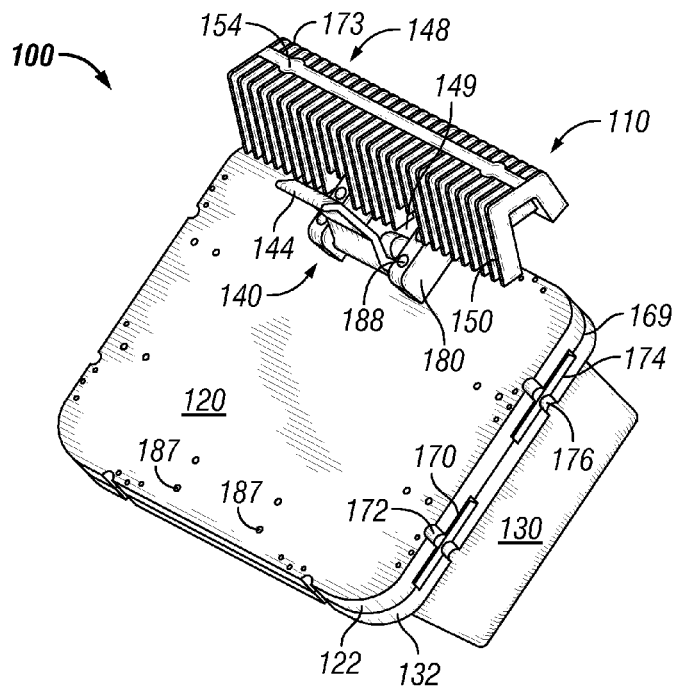
Figure 1D:
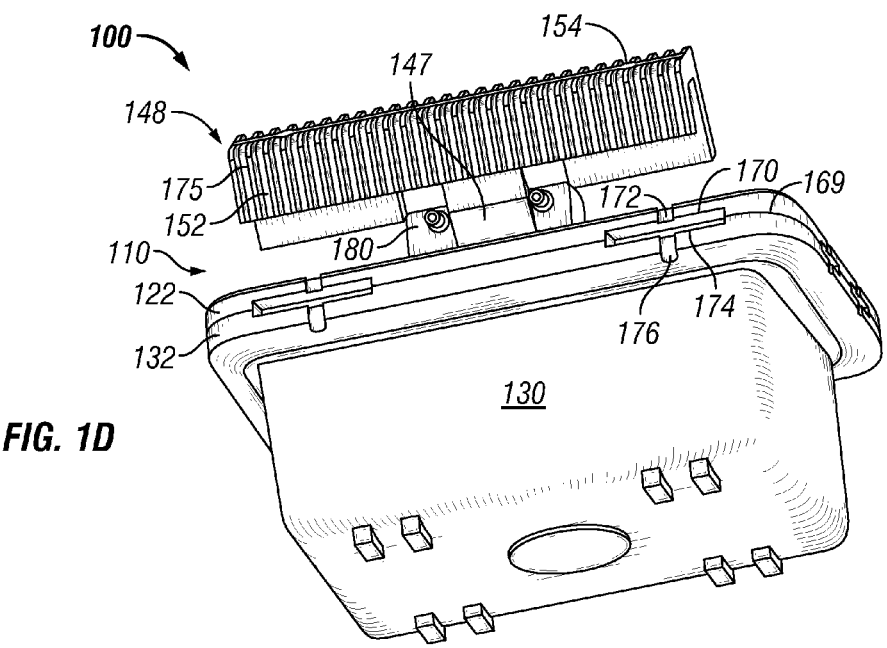
Figure 1E:
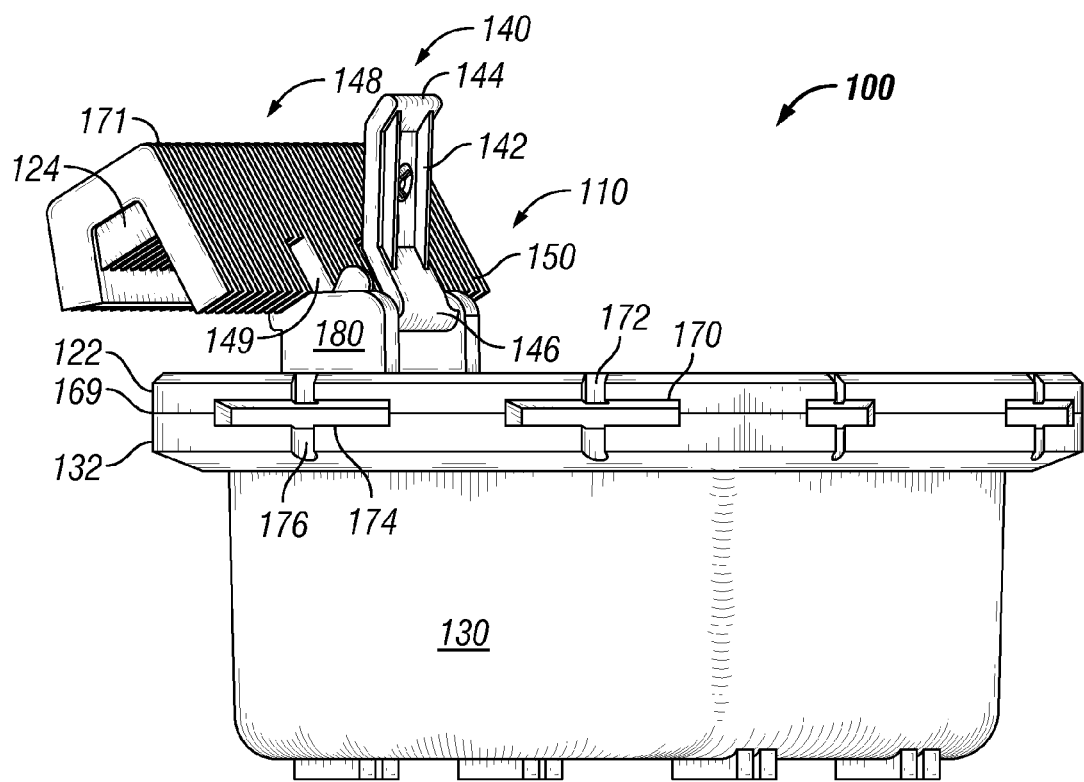

As shown in FIG. 1A, a total of four example fastening devices 110 are arranged around the perimeter of the cover flange 122 and the body flange 132. The air gap that forms between the surfaces of the cover flange 122 and the body flange 132 when the cover flange 122 and the body flange 132 converge is the flame path 169. One of the functions of the fastening devices 110 is to ensure that the flame path 169 is within an accepted tolerance in light of a particular standard for the explosion-proof enclosure 100.

The cover 120 (sometimes called an enclosure cover or an enclosure portion) and the base 130 (sometimes called an enclosure base) of the explosion-proof enclosure 110 are secured using the fastening devices 110. The fastening device 110 in this case includes a bracket 148. The bracket 148 as shown in FIGS. 1A-E is substantially U-shaped, but the bracket 148 can also have one or more of a number of other shapes. The bottom side 152 of the bracket 148 can be anti-parallel to the top side 150, where the top side 150 is substantially perpendicular to the back side 154 that joins (mechanically couples) the top side 150 and the bottom side 152. The back side 154 can form a single piece with the top side 150 and/or the bottom side 152, as in a forged manufacturing process. Alternatively, the back side 154 can be a separate member that is mechanically coupled to the top side 150 and/or the bottom side 152. In such a case, the back side 154 can be mechanically coupled to the top side 150 and/or the bottom side 152 using one or more of a number of methods, including but not limited to welding, fastening devices, epoxy, and overlaying brackets, and slotted receivers.

In certain example embodiments, one or more optional ribs 124 are disposed substantially vertically along the inner surface of the back side 154 of the bracket 148. The ends of each rib 124 may also be disposed on the bottom surface of the top side 150 and/or on the top surface of the bottom side 152 of the bracket 148. The ribs 124 can be of any dimensions (e.g., length, width, height thickness) and/or shape. The dimensions of a rib 124 can be substantially similar to some or all other ribs 124 disposed on the underside of the bracket 148. A rib 124 can have a straight outer edge. Alternatively, a rib 124 can have an outer edge that is non-linear. As shown in FIGS. 1A-E, the rib 124 toward the end of the bracket 148 can have a distal end that is substantially parallel to the back edge of the back side 154 of the bracket 148.

In addition to enhancement of the structural integrity of the bracket 148 for maintaining a flame path 169 between the cover flange 122 and the body flange 132, the ribs 124 can be used for one or more other purposes. For example, the ribs 124 can be used to properly position and maintain contact by the bracket 148 with a particular portion of the cover flange 122 and/or the body flange 132. In such a case, detents can be cut into one or more surfaces of the cover flange 122 and/or the body flange 132 that contact the ribs 124 when the bracket 148 is properly positioned. Each example detent can have dimensions (e.g., depth, width, length) that are slightly larger than the corresponding dimensions of the rib 124 that mechanically couples with the detent. A detent can be cut into an outer edge of the cover flange 122, an outer edge of the body flange 132, a top surface of the cover flange 122, and/or a bottom surface of the body-flange 132.

In certain example embodiments, the top side 150 of the bracket 148 is longer than the bottom side 152. In such a case, there is more overlap of the cover flange 122 by the top side 150 relative to the amount of overlap of the base flange 132 by the bottom side 152, which resists deflection of the cover 120 by the top side 150. The length of the top side 150 can depend on one or more of a number of factors, including but not limited to the size of the cover 120, the thickness of the top side 150, the location of any components (e.g., indicating lights, switch handle, viewing window) disposed on the surface of the cover 120, and the existence and size of any slots (e.g., vertical slot 172, horizontal slot 170, vertical slot 176, horizontal slot 174) disposed along the edge of the cover flange 122 and/or the body flange 132.

In addition, some or all of the bracket 148 can be made thicker to improve the structural integrity of the bracket 148. The added thickness of the bracket 148 can extend to all or select portions (i.e., the top side 150, the bottom side 152, and the back side 154) of the bracket 148. In addition, the added thickness of the bracket 148 can be made to all or select portions of the top side 150, the bottom side 152, and/or the back side 154. The thickness of the bracket can be measured with or without consideration of the ribs 124 on the under side of the bracket 148.

When the bracket 148 is engaged with the enclosure 100, the top side 150 of the bracket 148 contacts at least a portion of the top surface of the cover flange 122 (and also, in some cases, the cover 120), and the bottom side 152 of the bracket 148 contacts at least a portion of the bottom surface of the base flange 132. In certain example embodiments, the cover flange 122 and/or the body flange 132 is shaped to conform to the bracket 148. For example, in this case, the bottom portion of the body flange 132 includes a chamfer 188 that is formed at a downward angle that is substantially parallel to the bottom side 152 of the bracket 148 when the bracket 148 is engaged with the explosion-proof enclosure 100. In certain alternative example embodiments, the bottom side 152 is substantially perpendicular to the back side 154, and the top side 150 is antiparallel to the bottom side 152. In such a case, the body flange 132 does not include the chamfer 188, but the top portion of the cover flange 122 does include a chamfer that is cut at an upward angle and is substantially parallel to the top side 150 of the bracket 148 when the bracket 148 is engaged with the explosion-proof enclosure 100.

The top side 150 of the bracket 148 can include an engagement, portion 147. The engagement portion 147 is located at the distal end of the top side 150 and is mechanically coupled to the lever 140 (described below). The engagement portion 147 can form a single piece with the top side 150, as in a forged manufacturing process. Alternatively, the engagement portion 147 can be a separate member that is mechanically coupled to the top side 150. In such a case, the engagement portion 147 can be mechanically coupled to the top side 150 using one or more of a number of methods, including but not limited to welding, fastening devices, epoxy, and overlaying brackets, and slotted receivers. The engagement portion 147 can be fixedly coupled or movably (e.g., hingedly) coupled to the lever 140.

In certain example embodiments, the fastening device 110 is "boltless," meaning that such a fastener (e.g., bolt, screw) is not used to directly couple the cover flange 122 and the body flange 132. In addition, optionally, the top side 150, the back side 154, and/or the bottom side 152 each can have can array of protrusions. For example, optional protrusions 171 (e.g., ribs, fins) can be disposed upon the top side 150, optional protrusions 173 can be disposed upon the back side 154, and optional protrusions 175 can be disposed upon the bottom side 152. Such protrusions 171 can serve one or more of a number of purposes. For example, the protrusions 171 can provide structural reinforcement and maintain mechanical integrity of the bracket 148.

The protrusions 171 can be aligned in one or more of any number of alignments, including but not limited to perpendicular to the cover flange 122, as shown, for example, in FIG. 1A. In addition, when there are multiple protrusions 171 on a surface (e.g., the top side 150), each protrusion 171 can be oriented in any manner relative to the other protrusions 171 on the surface, including but not limited to in parallel, as shown in FIG. 1A. Each protrusion 171 can be of any height and/or thickness. In addition, each protrusion 171 can have varying heights and/or thicknesses along the length of the protrusion 171. The protrusions 171 can form a single piece with the bracket 148, as in a forged manufacturing process. Alternatively, the protrusions 171 can be separate members that are mechanically coupled to the bracket 148. In such a case, the protrusions 171 can be mechanically coupled to the bracket 148 using one or more of a number of methods, including but not limited to welding, fastening devices, epoxy, and overlaying brackets, and slotted receivers.

In addition to the bracket 148, the fastening device 110 can include a lever 140. The lever 140 can include a handle 144 located at the distal end, a body 142, and a hinged coupling feature 146 (which can also be called a retaining feature or a detent) at the proximal end. In certain example embodiments, the lever 140 is mechanically coupled to the top side 150 using the hinged coupling feature 146. For example, the hinged coupling feature 146 can hingedly couple to a corresponding engagement portion 147 of the top side 150. In such a case, a tubular aperture can traverse the length of both the hinged coupling feature 146 and the engagement portion 147, and the two pieces are joined by inserting a pin (described below with respect to FIGS. 2A-C) into the apertures. The pin maintains the hinged coupling between the bracket 148 and the lever 140.

The lever 140 can also be mechanically coupled to the bracket 148 in one or more of a number of other ways. In any case, when the lever 140 is engaged, the coupling between the lever 140 and the bracket 148 causes the bracket 148 to become engaged with the enclosure 100. Likewise, when the lever 140 is disengaged, the coupling between the lever 140 and the bracket 148 causes the bracket 148 to become disengaged from the enclosure 100.

In addition or in the alternative, the coupling feature 146 can be used to mechanically couple other various components of the fastening device 110 and/or explosion-proof enclosure 100 to each other. For example, the coupling feature 146 can mechanically couple the cover 120 to the bracket 148. As another example, the coupling feature 146 can mechanically couple the body 130 to the bracket 148. In such a case, the coupling feature 146 can include one or more pieces that can each have one or more of a number of features (e.g., sliding features, hinged features, fastening receivers) to allow the coupling feature 146 to couple together components of the fastening device 110 and/or explosion-proof enclosure 100.

In certain example embodiments, the coupling of the lever 140 and the bracket 148 is mounted to the outer surface of the cover 120. For example, at least one mounting support 180 is mechanically coupled to the cover 120. In such a case, the mounting support 180 can be mounted on the cover 120 using one or more methods, including but not limited to welding, fastening devices, and mating threads. In this particular example, threaded apertures 187 in the cover 120 traverse at least a portion of the thickness of the cover 120. Corresponding apertures traverse the height of each mounting support 180 so that one or more fastening devices (e.g., bolt) can be used to secure the mounting support 180 to the cover 120. In alternative embodiments, the mounting support 180 forms a single piece with the cover 120, as from a cast.

To allow the bracket 148 to become engaged with the enclosure 100, one or more openings 149 can be created in a distal portion of the top side 150 of the bracket 148. Such openings 149 can be sized to allow certain portions of the mounting support 180 to be positioned within the opening 149 when the bracket 148 is engaged with the enclosure 100.

Figure 2A:
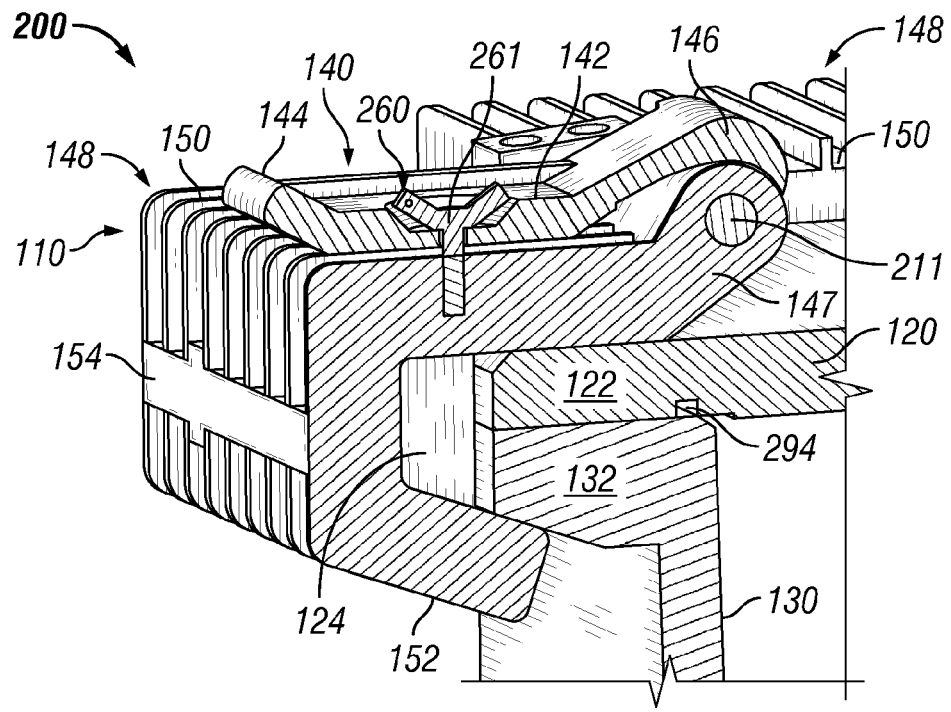
FIGS. 2A-2C show various views detailing the example fastening devices for an explosion-proof enclosure in accordance with certain example embodiments.
Figure 2B:
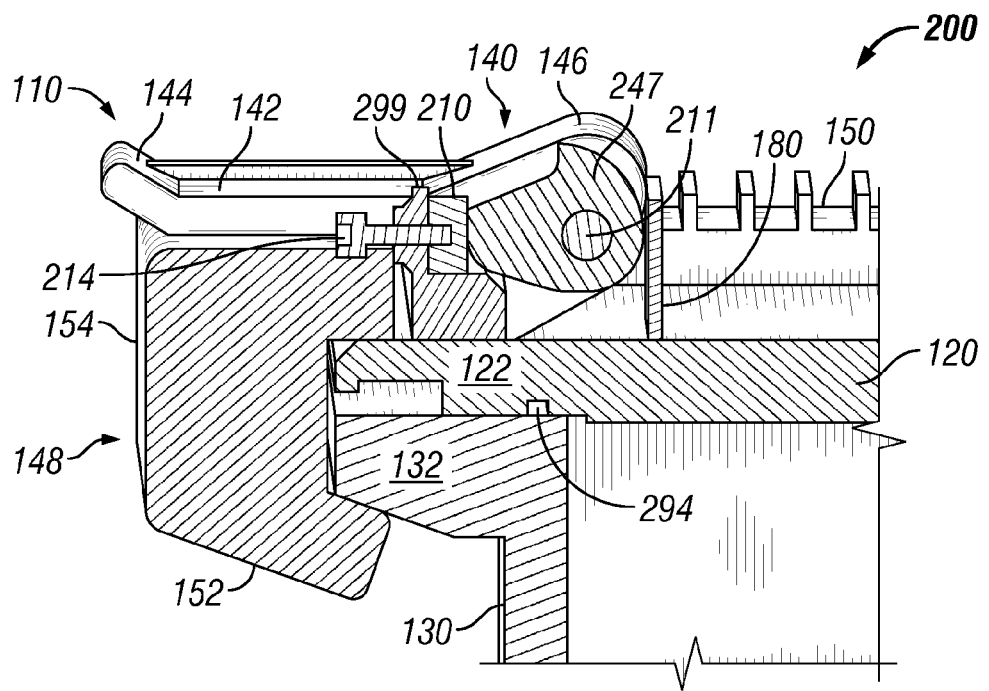
Figure 2C:
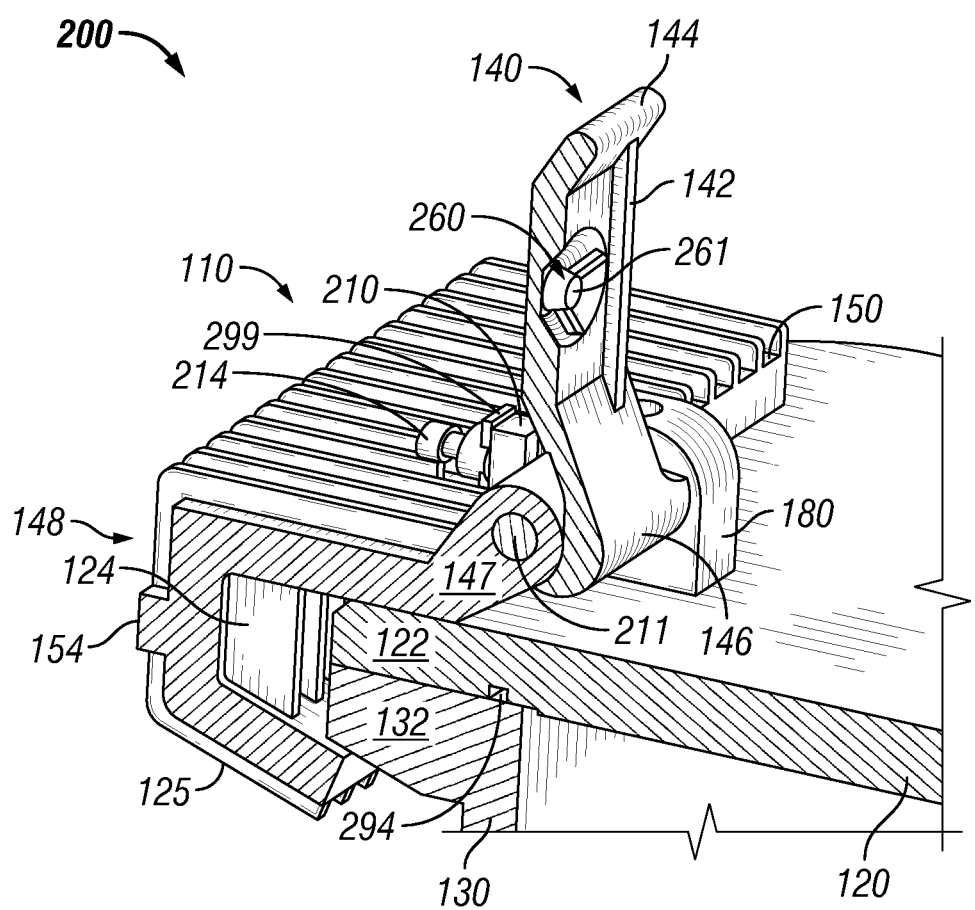

FIGS. 2A-C show various views detailing the example fastening devices 110 for an explosion-proof enclosure 200 in accordance with certain example embodiments. Specifically, FIGS. 2A-C each show a different cross-sectional side perspective view of the fastening devices 110 to provide detail as to how, in certain example embodiments, the lever 140 is used to engage the bracket 148 with, and disengage the bracket 148 from, the enclosure 200. In particular, referring to FIGS. 1A-2C, the bracket 148 engages the enclosure 200 when the lever 140 is put in the closed position, which occurs by pushing the handle 144 downward, toward the bracket 148. As this occurs, the cam 247 of the fastening device 110 is engaged and draws the bracket 148 toward the enclosure 200 (to the right in FIGS. 2A-C). When the bracket 148 is drawn toward the explosion-proof enclosure 200, the bottom side 152 of the bracket 148 supplies a compressive force to the base flange 132 against the cover flange 122 to reduce the flame path 169.

When the lever 140 is in the open position, the bracket 148 is disengaged from the enclosure 100. In certain example embodiments, a gasket 294 is fit inside a channel (hidden from view by the gasket 294) on the bottom surface of the cover flange 122 and/or the top surface of the base flange 132. In such a case, as the bracket 148 is drawn toward the explosion-proof enclosure 200, the gasket 294 is compressed, providing a seal against ingress while providing a flame path 169 that meets one or more applicable standards (e.g., flame path 169 no greater than 0.0015 inches).

An optional securing device 261 can be mechanically coupled to a portion (e.g., the top side 150) of the bracket 148. In certain example embodiments, when the lever 140 reaches the fully-closed (engaged) position, an optional securing device 261 traverses an aperture 260 in a portion (e.g., along the body 142) of the lever 140 and engages that portion of the lever 140 to secure the lever 140 in the fully-closed (engaged) position. For example, as shown in FIG. 2A, the securing device 261 is a wing-headed screw that is disposed within and engages a slot in the aperture 260 in the body 142 of the lever 140 to secure the lever 140 against the bracket 148 when the lever 140 is in the fully-closed position. The securing device 261 provides tamper resistance and can require a tool (not shown) to release the lever 140. The tool can be a specially-designed tool or a standard, tool (e.g., a screwdriver). Other examples of the securing device 261 can include, but are not limited to, a screw, a detent, and a bolt. Further, the securing device 261 can be positioned in one or more of a number of different locations with respect to the lever 140. Other examples of a securing device are shown in FIGS. 5-9B.

FIG. 2B shows how the compressive force applied by the bracket 148 can be adjusted. A fastener 214 can be driven into and/or extracted from an aperture along the edge 299 of a mounting support 180. As shown in FIG. 2B, the edge 299 of a mounting support 180 can be horizontal, vertical (as shown), or have a slope. When, the fastener 214 is oriented horizontally through the edge 299, the fastener 214 can be driven into and/or extracted from the edge 299 of the mounting support 180. In such a case, as the fastener 214 is driven into and extracted away from the cam 247, a horizontal force is applied to and taken away from, respectively, the cam 247 by the optional wear plate 210. The optional wear plate 210 can be positioned between the edge 299 and the cam 247. The wear plate 210 can align with the aperture through the edge 299 that is traversed by the fastener 214. By having the fastener 214 and wear plate 210 oriented substantially as shown, less force (e.g., $\frac{2}{3}$ less force) may be used to drive the fastener 214 into and/or extract the fastener 214 from the edge 299 of a mounting support 180. As a result, less effort is required to adjust the compressive force applied by the bracket 148 through the cam 247.

Such adjustments to the fastener 214 can be made during manufacturing and/or in the field. The wear plate 210 is used to apply the proper load to the cam 247, and which causes the proper amount of force to be applied by the bracket 148 on the enclosure 200 to provide a proper flame path 169. If too much clamping force is required of the cam 247, the flame path 169 will be too small, which could increase the pressure developed from an explosion inside the explosion-proof enclosure 200 and exceed the strength of the explosion-proof enclosure 200. If too little clamping force is required of the cam 247, the flame path 169 will be too large, which could let the flame escape from the explosion-proof enclosure 200. In either case, the standards required for an explosion-proof 200 may not be met.

FIGS. 2A-C help illustrate how moving the handle 144 to transition the lever 140 from the fully-closed position (as shown in FIGS. 2A and 2B) to the open position (as shown in FIG. 2C) also moves the bracket 148 from engaging the enclosure 200 (specifically, the cover flange 122 and the body flange 132) to disengaging the enclosure 200. When this occurs, explosion-proof enclosure 200 can be opened. First, the engaging member 261 is released (in this case, unscrewed) from the aperture 260 within the body 142 of the lever 140. Releasing the engaging member 261 may be performed using a tool. Then, the lever 140 is lifted upward by the handle 144 and toward the explosion-proof enclosure 200.

As the lever 140 moves away from the fully-closed position to the open position, the cam 247 rotates and pushes the engagement portion 147 (and thus the rest of the bracket 148) away from the enclosure 200. In certain example embodiments, the distance that the engagement portion 147 is pushed away from the enclosure 200 is limited by the extent that the wear plate 210 is positioned relative to the cam 247. Such a method of disengaging the bracket 140 from the enclosure 200 is advantageous if oxidation has formed between the bracket 140 and the enclosure 200 because separating the two is easier and less prone to breaking or damaging the bracket 140, the enclosure 200, or some other component or device associated with the enclosure 200. When the bracket 148 is pushed away from the explosion-proof enclosure 200, the compressive force supplied by the bottom side 152 of the bracket 148 to the base flange 132 is reduced or eliminated. In such a case, as the bracket 148 is pushed away from the explosion-proof enclosure 200, the gasket 294 is decompressed, removing the seal against ingress and widening and/or eliminating the flame path 169.

To use one or more hinges 183 between the cover 120 and the base 130, the bracket 148 is then manually pushed (as by a user) upward (or in some other direction, depending on how the explosion-proof enclosure 200 is oriented when mounted, and/or if the bracket 148 and/or fastening device 110 are oriented differently (e.g., inversely) from what is shown in FIGS. 1A-1E) and further away from the explosion-proof enclosure 200 (as shown, for example, in FIGS. 1B-1E) after the bracket 148 is disengaged from the enclosure 200. The movement of the bracket 148 away from the explosion-proof enclosure 200 can be limited, as by the lever 140 shown, for example, in FIG. 1B. When the bracket 148 has moved far enough away from the explosion-proof enclosure 200 to clear the cover 120 and the base 130, the bracket 148 can be rotated upward (toward the cover 120) using the hinged coupling between the hinged coupling feature 346 of the lever 140 and the engagement portion 147 of the bracket 148.

As all of the fastening devices 110 are mounted on the top surface of the cover 120, there is an area on the top surface of the cover 120 within which existing components (e.g., switches, indicating lights, pushbuttons) on the outer surface of the cover 120 can be located without interfering with the operation of such fastening devices 110. The size of this area can vary. For example, the distance between an edge of the cover 120 and the closest portion of the area may be two inches or less.

Further, the profile of a fastening device 110 can be relatively small. For example, the distance between the top of the back side 154 of the bracket 148 and the top of the hinged coupling feature 146 and/or the handle 144 of the lever 140 should be as small as possible (e.g., no more than two inches). As another example, the distance between the bottom of the back side 154 and the end of the bottom side 152 can be minimal (e.g., no more than one inch).

Such distances can be larger, particularly when example fastening devices 110 described herein are used to retrofit an existing explosion-proof enclosure that has bolts or other traditional fastening devices. In such a case, the characteristics (e.g., height, width, depth, location of components disposed on the cover) of the existing explosion-proof enclosure can dictate the size of the fastening device 110.

FIGS. 3-7B show various example securing features for a fastening device in accordance with certain example embodiments. In certain example embodiments, the fastening devices (or portions thereof) described herein are made of one or more materials that is somewhat flexible (to allow for securing and being released), corrosion-resistant, and/or substantially retains its shape. Examples of such material can include, but are not limited to, stainless steel, nylon, and plastic.

Figure 3:
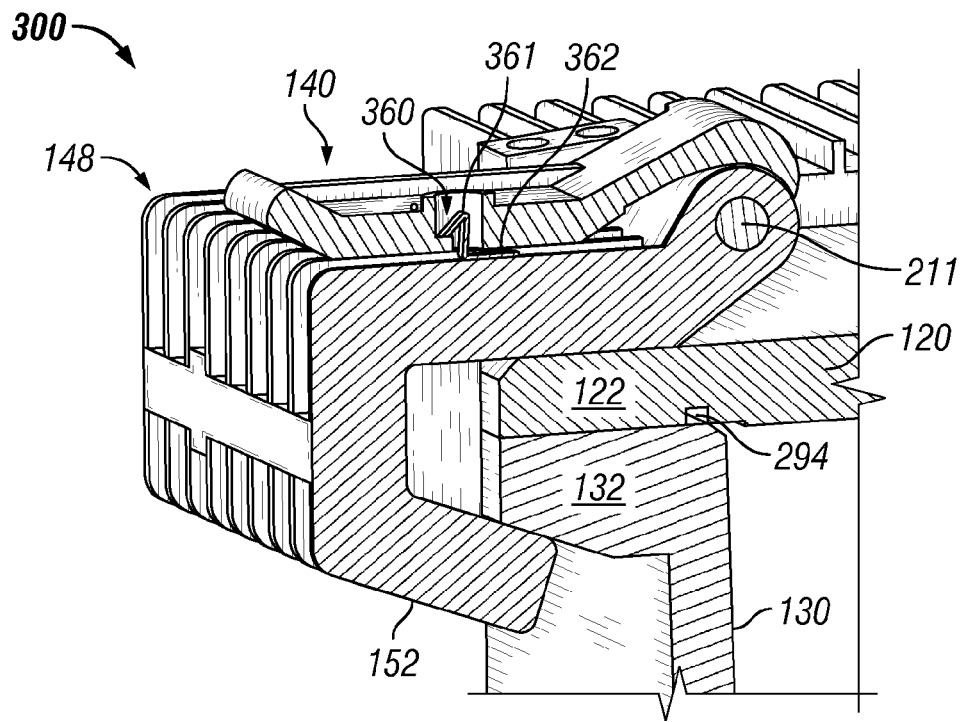
FIG. 3 shows a cross-sectional side perspective view of an example safety latch mechanism for a fastening device in accordance with certain example embodiments.

Referring to FIGS. 1A-7B, the securing feature of FIG. 3 is a spring clip 361, where the distal end of the spring clip 361 traverses an aperture 360 in the lever 140. The proximal end of the spring clip 361 is mechanically coupled, using a fastening device 362, to the top surface of the top side 150 of the bracket 148. The aperture 360 in the lever 140 is positioned, in such a way that, when the lever 140 is in the fully closed position, the distal end of the spring clip 361 traverses through the aperture 360 and latches onto the top surface of the body 142 of the lever 140.

To allow the lever 140 to move from the fully-closed position to the fully open position, the spring clip 361 roust be released. Because the spring clip 361 is recessed within the aperture 360, a special tool (e.g., small screwdriver) can be used to release the spring clip 361 and allow the lever 140 to be moved. The spring clip 361 is recessed to prevent accidental release of the spring clip 361. When the spring clip 361 is released, the lever 140 is able to move from the fully-closed position to the open position.

Figure 4:
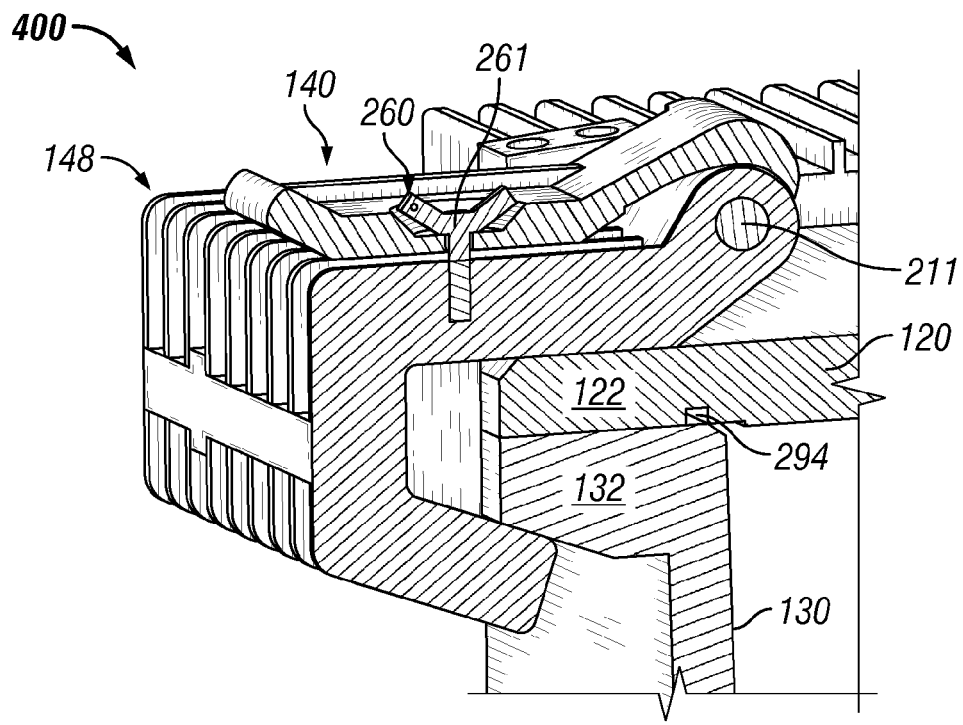
FIG. 4 shows a cross-sectional side perspective view of another example safety latch mechanism for a fastening device in accordance with certain example embodiments.
Figure 5:
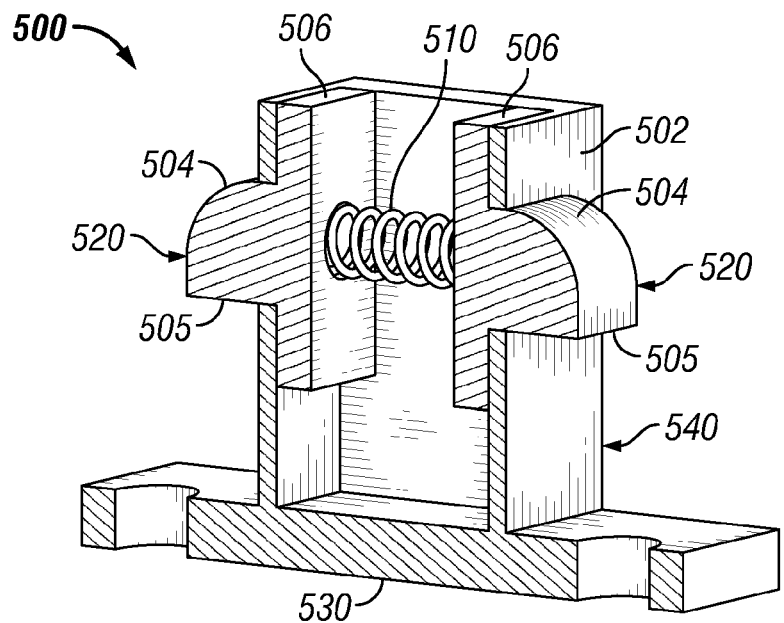
FIG. 5 shows a cross-sectional side perspective view of yet another example safety latch mechanism for a fastening device in accordance with certain example embodiments.

FIG. 4 shows a cross-sectional side perspective view of the securing feature shown and described above with respect to FIG. 2A. Specifically, the securing feature of FIG. 4 is a wing-headed screw 261 inserted through an aperture 260 in the lever 140 and threadably coupled to the top side 150 of the bracket 148. As with the securing feature of FIG. 3, the head of the screw 261 of FIG. 4 is positioned in a recessed area of the aperture 260, which helps prevent accidental or inadvertent unscrewing of the screw 261.

FIGS. 5-7B show various example embodiments of securing features that include one or more detents. Referring to FIGS. 1A-7B, a detent is a mechanical device or component that can prevent movement of an adjacent device or component when the detent is placed in a certain position relative to the adjacent device or component. For example, as shown in the cross-sectional side perspective view of FIG. 5, the securing feature 500 includes a housing 540, a pair of detents 520, and a compressive spring 510 placed between the detents 520.

The bottom 530 of the housing 540 can be mechanically coupled to the top surface of the top side 150 of the bracket 148. In such a case, the securing feature 500 can protrude through or be disposed within an aperture in the body of the handle, as with the aperture 360 shown in FIG. 3 above. Alternatively, the bottom 530 of the housing 540 can be part of the top surface of the top side 150 of the bracket 148, as from a single piece formed from a mold. The detents 520, in a normal position, protrude through apertures (hidden from view by the detents 520) in opposite walls 502 of the housing 540.

The detents 520 remain in such a normal position because the compressive spring 510, mechanically coupled, to the detents 520 (e.g., positioned within openings in the back of each detent 520), applies an outward force against the detents 520. Each detent 520 is prevented from being pushed outside the housing 540 by a back surface 506 located inside the housing 540 and that extends beyond the aperture in the walls 502 through which the quarter-circular (curved) portions 504 of the detents 520 protrude. The shape of the quarter-circular portions 504 do not have to be quarter-circular, but rather can be some other curved and/or angled shape.

The bottom portion 505 of the quarter-circular portion 504 of each detent 520 is flat and substantially horizontal to the bottom 530 of the housing 540. In certain example embodiments, the bottom portion 505 of each detent 520 is used to keep the lever 140 in the closed position. In other words, the lever 140 can be positioned between the bottom portion 505 of the detent 520 and the top surface of the bottom 530 of the housing 540. When the lever 140 is moved into the fully-closed position, the housing 540 fits within an aperture in the lever 140. In addition, the edges of the aperture in the lever 140 contact the curved surface of the quarter-circular portions 504 of the detents 520 and force the detents 520 to move inward, compressing the spring 510. Generally, this is referred to as engaging the detents 520.

When the lever 140 gets to the fully-closed position, the sides of the aperture in the lever 140 clear the detents 520, and the compressive spring 510 force the detents 520 outward to their normal position, extending beyond the walls 502 of the housing 540. To release the securing feature 500, an inward force must be applied to both detents 520, where the inward force overcomes the compressive force imposed by the spring 510. Generally, this is referred to as releasing the detents 520. Once the detents 520 no longer protrude through the apertures in the walls 502 of the housing 540, the lever 140 can be moved out of the fully-closed position.

Figure 6:
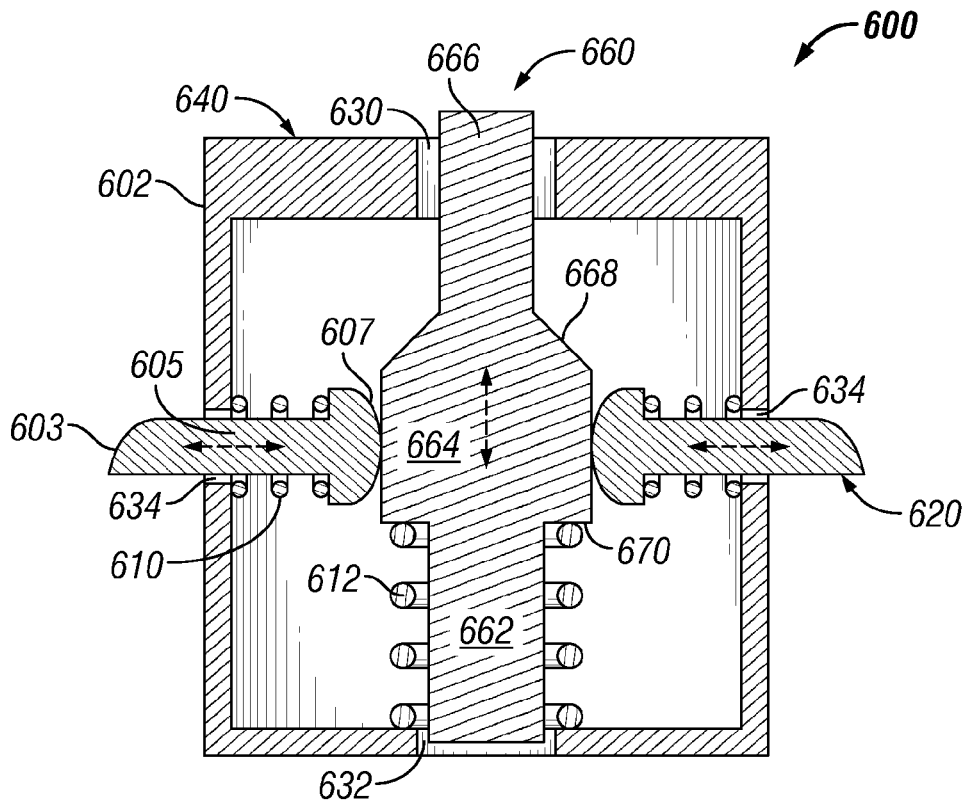
FIG. 6 shows a cross-sectional side perspective view of still another example safety latch mechanism for a fastening device in accordance with certain example embodiments.

FIG. 6 shows a cross-sectional side view of an alternative example securing feature 600 that uses detents 620. In this example, inside the housing 640, a compressive spring 610 is positioned between the head 607 of each detent 620 and a side wall 602 of the housing 640. The compressive springs 610 force the detents 620 inward to contact a plunger 660 having varying thicknesses along its length and that extends vertically through the housing 640. The top end 666 and the bottom end 662 of the plunger 660 are thinner and can have substantially similar circumferences (or perimeters, if the cross-sectional shape of the top end 666 and the bottom end 662 are not round) compared to the middle 664 of the plunger 660. In other words, the middle 664 portion of the plunger 660 can be thicker (have a larger perimeter) than the top end 666 and the bottom end 662.

In certain example embodiments, the securing feature 600 is mechanically coupled to the top surface of the top side 150 of the bracket 148. Alternatively, the housing 640 can be part of the top surface of the top side 150 of the bracket 148, as from a single piece formed from a mold. In certain example embodiments, the detents 620 protrude through apertures 634 in opposite side walls 602 of the housing 640. The detents 620 are positioned high enough relative to the bottom of the housing 640 and extend far enough beyond the side walls 602 through the apertures 634 of the housing 640 to keep the lever 140 in the closed position. In other words, the lever 140 can be positioned between the distal end 603 of the detent 620 and the top surface of the top side 150 of the bracket 148 when the lever 140 is in the fully-closed position.

The transition 670 between the middle portion 664 and the bottom end 662 can be abrupt, forming a substantially perpendicular segment to the middle portion 664 and the bottom end 662. On the other hand, the transition 668 between the middle portion 664 and the top end 666 is gradual and sloped. The abruptness of the transition 670 allows for a compressive spring 612 that is positioned between the bottom of the housing 640 and the transition 670 between the middle portion 664 and the bottom end 662. The compression spring 612 forces the plunger 660 upward inside the housing 640. In certain example embodiments, when the spring 612 is fully extended (in a normal state), the plunger 660 is in a normal position within the housing 640, so that the detents 620 contact the middle portion 664 of the plunger 660.

The top of the housing 640 can include an aperture 630 through which, the top end 666 of the plunger 660 protrudes and/or can be accessed. When a downward force is applied to the top end 666 of the plunger 660 through the aperture 630, the plunger 660 can move downward if the force applied is greater than the compressive force of the spring 612. In such a case, the detents 620, forced inward by the compressive force of the springs 610 under tension, slide down the transition 668 between the middle portion 664 and the top end 666 of the plunger 660, and eventually contact the top end 666 of the plunger 660 as the plunger 660 is pushed downward. This action releases the detents 620. When this occurs, the detents 620 no longer protrude through the apertures 640 in the side walls 602, which allows the lever 140 to be moved out of the fully-closed position. In certain example embodiments, the bottom of the housing 640 can include an aperture 632 through which the bottom end 664 of the plunger 660 protrudes when a downward force is applied to the top end 666 of the plunger 660.

When the downward force is no longer applied to the top end 666 of the plunger 660, the compressive force of the spring 612 pushes the plunger 660 upward until the plunger 660 is in the normal (natural) position. As this occurs, the detents 620 (again, caused by the compressive force of the springs 610 under tension) slide up the transition 668 between the top end 666 and the middle portion 664, and eventually contact the middle portion 664 as the plunger 660 returns to the normal position.

In certain example embodiments, the distal end 603 of the detents 620 have a curved feature, similar to the quarter-circular portions 504 of the detents 520 described above with respect to FIG. 5. In such a case, when the lever 140 is moved toward the fully-closed position, the housing 640 fits within an aperture in the lever 140. In addition, the edges of the aperture in the lever 140 contact the curved distal end 603 of each detents 620 and force the detents 620 to move inward, overcoming the compressive force of the springs 610. In such a case, if the head 607 of each detent 620 is rounded and aligns with the transition 668 between the top end 666 and the middle portion 664, then the inward force applied by the lever 340 to the distal end 603 of the detents 620 can cause the head 607 of the detents 620 to force the plunger 660 downward as the head 607 of the detents 620 slide down the transition 668 toward the top end 666. This action engages the detents 620. As a result, the distal end 603 of the detents 620 retract into the interior of the housing 640 through the apertures 634 in the side wall 602, which allows the lever 140 to move into the fully-closed position.

In alternative example embodiments, if the head 607 of each detent 620 aligns with the middle portion 664 rather than the transition 668 between the top end 666 and the middle portion 664, then a downward force can be applied to the plunger 660 in order to move the lever 640 into a fully-closed position. In such a case, the inward force applied by the rounded head 607 of the detents 620 can make applying a downward force on the plunger 660 easier to achieve.

The housing 640 can be any shape and/or size (e.g., width, height) suitable for providing securing functionality for a fastening device. Examples of a shape of the housing 640 can include, but not limited to, circular when viewed cross-sectionally, square when viewed cross-sectionally, oval when viewed cross-sectionally, and rectangular when viewed cross-sectionally.

Figure 7A:
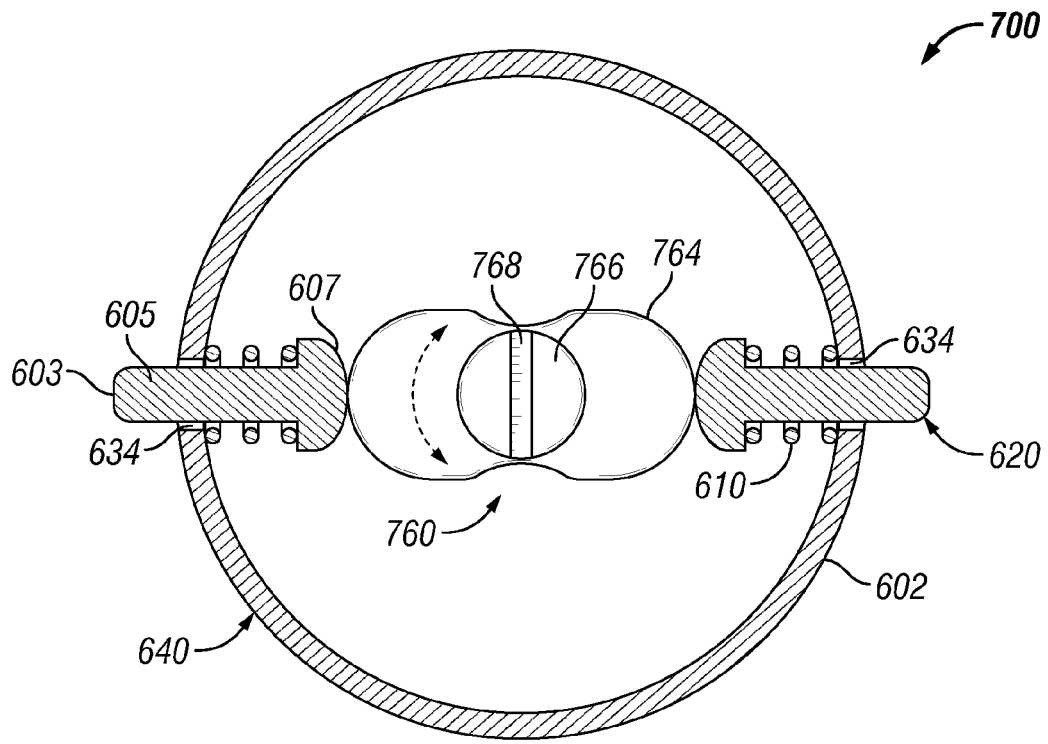
FIGS. 7A and 7B show various views of yet another example safety latch mechanism for a fastening device in accordance with certain example embodiments.
Figure 7B:
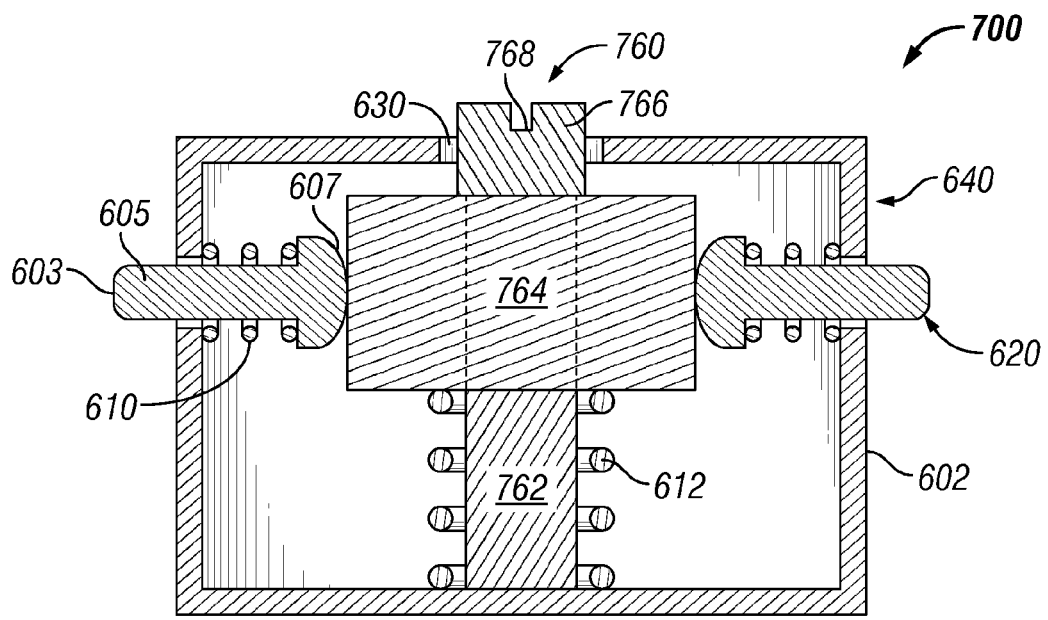

FIGS. 7A and 7B show a cross-sectional transparent top view and a cross-sectional side view, respectively, of an example securing feature 700 that is a variation of the securing feature 600 of FIG. 6. In this example, the housing 640 and the detents 620 are substantially the same as the housing 640 and detents 620 described above with respect to FIG. 6. In this case, the plunger 660 of FIG. 6 is replaced by a rotating actuator 760. The rotating actuator 760 has a top end 766, a bottom end 762, and a middle portion 764. In this case the rotating actuator 760 rotates around a vertical axis.

In certain example embodiments, the top end 766 of the actuator 760 protrudes through, or can be accessed through, an aperture 760 in the top wall of the housing 740 and includes one or more features that allow the actuator 760 to be rotated. In this example, the feature disposed on the top end 766 is a slot 768 into which a tool (e.g., a screwdriver) can be inserted and used to rotate the actuator 760. In certain example embodiments, the middle portion 764 has one or more features that allow the detents to move inward and/or outward as the actuator 760 rotates. For example, as shown in FIG. 7A, the cross-sectional top view of the middle portion 764 can have the shape of a "figure 8." Specifically, the middle portion 764 can be wider along one axis and narrower along another axis substantially perpendicular to the first axis.

In such a case, when the surface of the middle portion 764 is smooth, the compressive force applied by the springs 610 to the detents 620 force the head 607 of the detents 620 to continually make contact with the middle portion 764. Thus, when the wider axis of the middle portion 764 makes contact with the head 607 of the detents 620, as shown in FIG. 7A, the distal end 603 of the detents 620 extend outward through the apertures 634 in the wall 602 of the enclosure 640. Similarly, when the narrower portion of the middle portion 764 makes contact with the head 607 of the detents 620 (rotated 90° from what is shown in FIG. 7A), the distal end 603 of the detents 620 retract inward through the apertures 634 within the wall 602 of the enclosure 640.

In alternative embodiments, at least a portion of the middle portion 764 is not smooth (e.g., stepped, angled), which would allow the middle portion 764 to rotate on a ratchet principal or some similar force of motion. In such a case, the head 607 of the detents 620 can have a textured and/or non-smooth surface to allow for such movement of the middle portion 764. The middle portion 764 and/or the head 607 of the detents 620 can be shaped in such a way as to allow the middle portion 764 to rotate when the detents 620 are engaged by the lever 140. In other words, when the lever 140 is moved toward the fully-closed position, the lever 140 contacts the distal end 603 of the detents 620. This causes an inward force applied by the lever 140 to the distal end 603 of the detents 620.

In such a case, the head 607 of the detents 620 can contact the middle portion 764 and force the middle portion 764 to rotate from the wide axis to the narrow axis as the head 607 of the detents 620 move along the surface of the rotating middle portion 764. This action engages the detents 620. As a result, the distal end 603 of the detents 620 retract into the interior of the housing 640 through the apertures 634 in the side wall 602, which allows the lever 140 to move into the fully-closed position.

In certain example embodiments, the spring 712 shown in FIG. 7B disposed around the bottom end 762 between the middle portion 764 and the bottom of the housing 640 can be a tortional spring. The spring 712 can be optional because the detents 620 are rotationally actuated. If the detents 620 are aligned offset from the tangent point along the wide axis of the middle portion 764, the detents 620 would allow the lever (e.g., lever 140 of FIGS. 1A-1E above) to close without manual rotation of the top end 766 of the rotating actuator 760. Similarly, the rotating actuator 760 and the position of the detents 620 can reset themselves once closed the handle of the lever is in the fully-closed position.

In certain example embodiments, the actuator 760 has a spring-return or some other mechanism coupled to it to apply a force to the actuator 760 that causes the actuator 760 to return to a normal position. In this example, the normal position (as shown in FIG. 7A) is where the wide axis of the middle portion 764 is aligned with and contacts the detents 620.

Figure 8A:
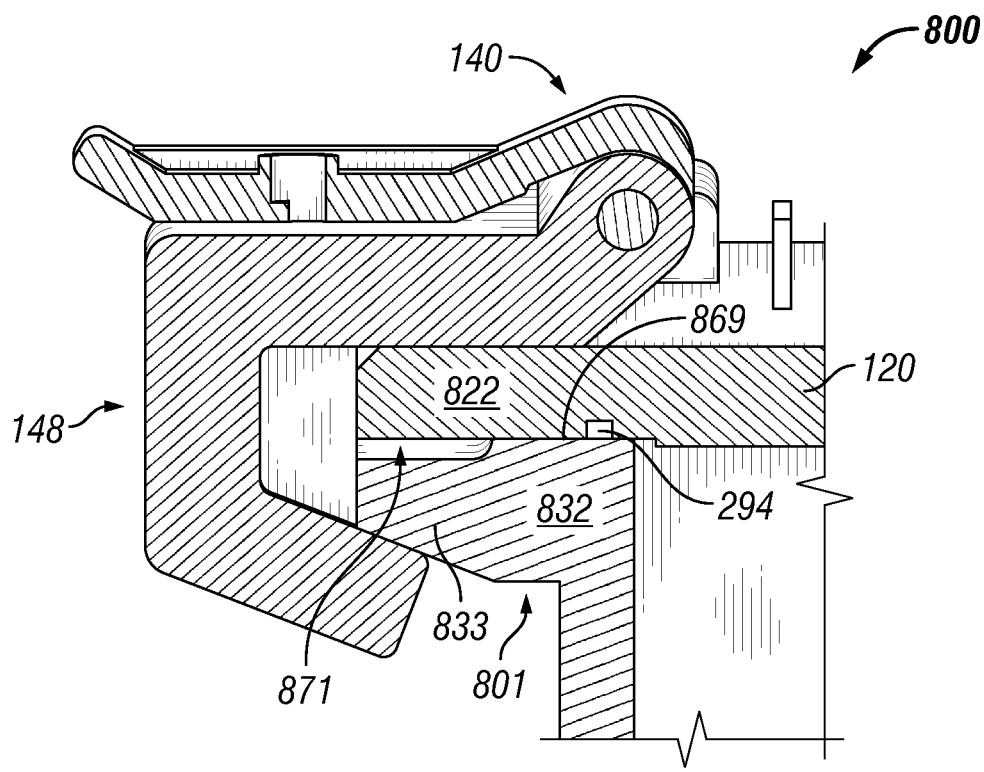
FIGS. 8A and 8B show various views of a flange relief feature in accordance with certain example embodiments.
Figure 8B:
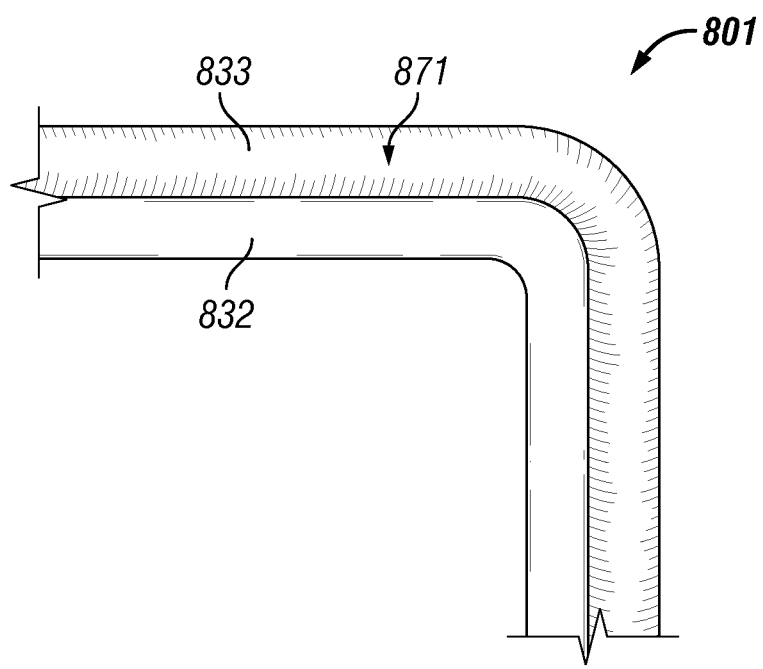

FIGS. 8A and 8B show various views of a flange relief feature in accordance with certain example embodiments. Specifically, FIG. 8A shows a cross-sectional side view of a portion of an enclosure 800 having an example flange relief feature 871. FIG. 8B shows a cross-sectional top view of the example body flange 801. The example flange relief feature 871 is shown disposed on the body flange 801. In addition or in the alternative, the flange relief feature 871 can be disposed on the cover flange 822. While descriptions herein are directed to the flange relief feature 871 being disposed on the body flange 801, the same descriptions can apply, additionally or alternatively, to the flange relief feature 871 being disposed on the cover flange 822.

Referring to FIGS. 1A-8B, the lever 140 and the bracket 148 are substantially the same as the corresponding components described above. The lever 140 and/or the bracket 148, however, are optional features with respect to the flange relief feature 871. In other words, the flange relief feature 871 can be used with any type of enclosure that has a cover with a cover flange and a body with a body flange. In addition, or in the alternative, the flange relieve feature 871 is not limited to enclosures that are fastened with brackets (or other forms of u-channel) or clamps. In other words, the example flange relieve feature 871 can be used with any type of enclosure, regardless of how the cover and base of the enclosure are coupled to each other.

The flange relief feature 871 in this case is a cavity or a recessed portion, similar to the cavity formed between the base flange and the cutout extension of the cover flange and used for certain example cover release mechanisms, as described above with regard to the co-filed patent application entitled "Cover Release Mechanisms for Enclosures." In this case, the cavity 871 is formed between the cover flange 822 and a cutout extension 833 of the base flange 801. In certain example embodiments, cavity 871 is continuous along the entire outer perimeter of the body flange 801. Alternatively, one or more segments of cavities 871 can be disposed around portions of the outer perimeter of the base flange 801. In any case, the portion, of the base flange 801 that is not recessed (not part of the flange relief feature 871) is called the normal portion 832 of the base flange 801.

When the cover 120 is mechanically coupled to the base 130, the normal portion 832 of the base flange 801 contacts a corresponding portion of the cover flange 822 and forms a flame path 869 therethrough. When the enclosure includes a bracket 148 (or some similar type of fastening device), the bracket 148 can be slidably coupled to the cover flange 822 and the base flange 801. In such a case, the bracket 148 applies an inward force to the cover flange 822 and the base flange 801, where the inward force increases contact pressure on the flame path 869 disposed between the flange relief feature 871, the cover flange 822, and the base flange 801.

In addition, the inward force applied by the bracket 148 on the cover flange 822 and the base flange 801 changes the bending moment (decreases the deflection), which limits the cover deformation and improves the surface contact between the cover flange 822 and the normal portion 832 of the body flange 801. When the surface contact between the cover flange 822 and the normal portion 832 of the body flange 801 is improved, the integrity of the flame path is improved as is the sealing capability of the gasket 294 by increasing contact pressure on the gasket 294.

As shown in FIG. 8B, the height, length, and/or depth of the flange relief feature 871 can vary. In addition, the number of flange relief features 871 can vary. Such design considerations of the flange relief feature 871 can be based on one or more of a number of factors, including but not limited to the desired/required flame path 869, the type of enclosure 800, and the material of the cover flange 822 and/or the base flange 801. For example, the depth of the flange relief feature 871 shown in FIG. 8B is approximately half (or slightly more than half of) the depth of the base flange 801. The flange relief feature 871 can have a finite length (as shown) or extend along an entire side and/or continuously along all sides of the base flange 801. Further, when the flange relief feature 871 has a finite length, along one side of the flange, there can be one flange relief feature 871 (as shown) or more than one flange relief feature 871.

Figure 9A:
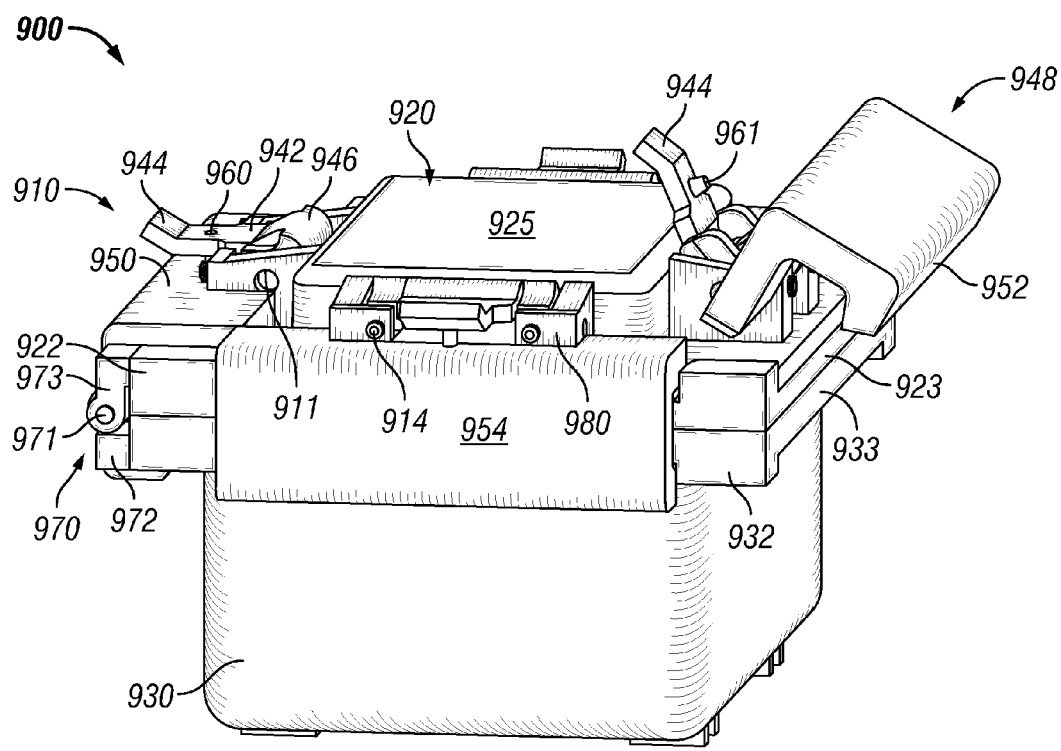
FIGS. 9A-9C show various views of another example fastening device for an explosion-proof enclosure in accordance with certain example embodiments.
Figure 9B:
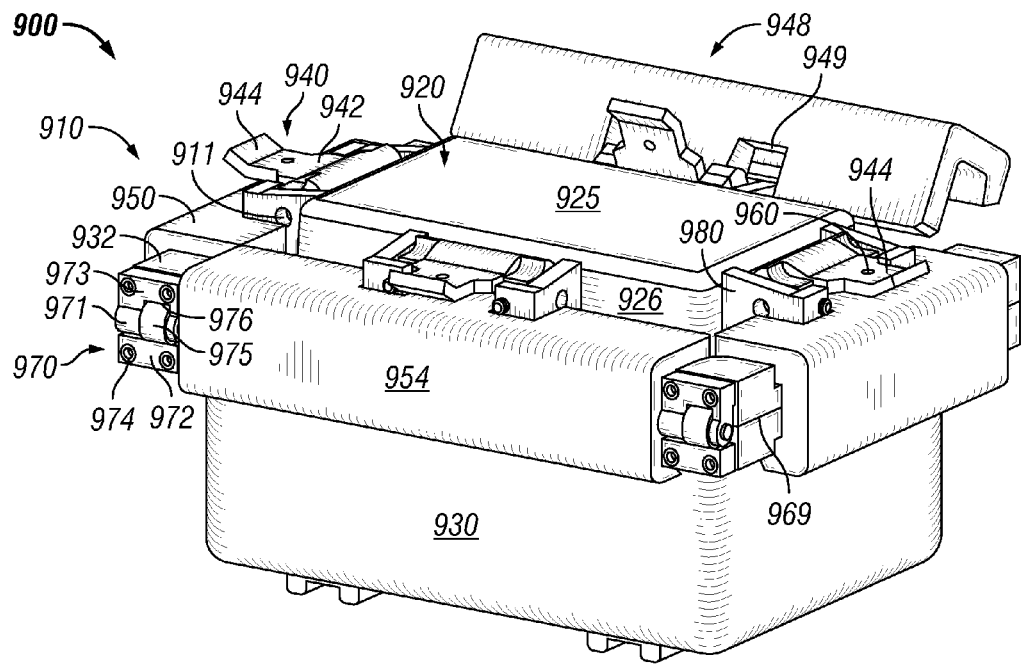
Figure 9C:
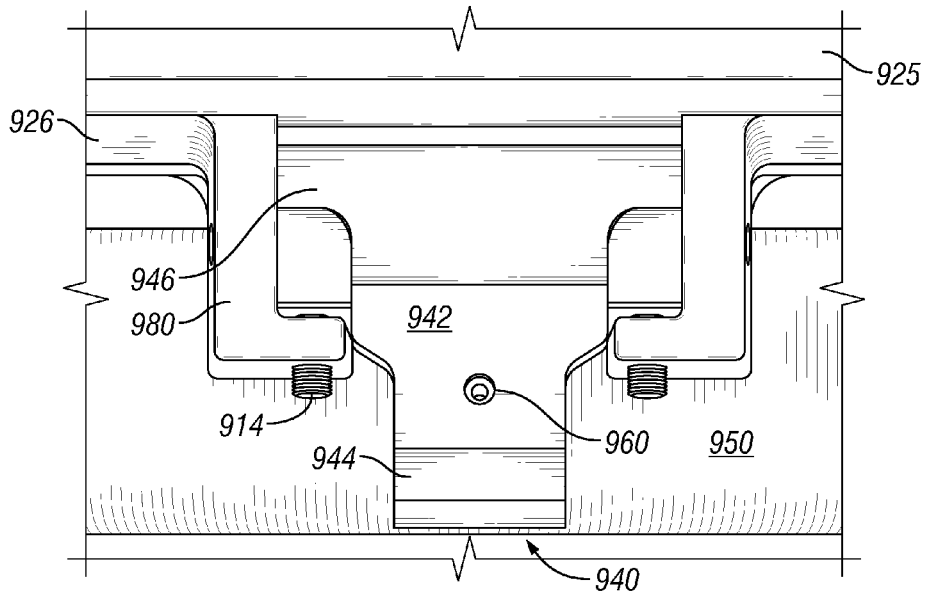

FIGS. 9A-9C show various views of another example fastening device 910 for an explosion-proof enclosure 900 in accordance with certain example embodiments. Specifically, FIGS. 9A and 9B show top perspective views of the explosion-proof enclosure 900. Further, FIG. 9C shows a top view of the example fastening device 910. In one or more example embodiments, one or more of the components shown in FIGS. 9A-9C may be omitted, repeated, and/or substituted. Accordingly, example embodiments of a fastening device for an explosion-proof enclosure should not be considered limited to the specific arrangements of components shown in FIGS. 9A-9C.

The example fastening device 910 and the example explosion-proof enclosure 900 can have some features that are similar to the features of the fastening device 110 and the example explosion-proof enclosure 100 of FIGS. 1A-1E above, with some of the differences explained below. Referring to FIGS. 1A-9C, the example explosion-proof enclosure 900 has a cover 920 that includes a domed portion 925 that protrudes upward and is substantially centered on the cover 920. In certain example, embodiments, the domed portion 925 is coupled to the rest of the cover 920 by side walls 926 that are substantially perpendicular to the domed portion 925 and the rest of the cover 920. The side walls 926 can also extend from the cover 920 at any other non-perpendicular angle. Further, the side walls 926 and/or the domed portion 925 can be flat, curved, and/or have other shapes and/or features. For example, the side walls 926 and the domed portion 925 can form a semi-sphere that extends upward from the cover 920.

A side wall 926 can include one or more mounting supports 980 that extend outward from the side wall 926. The mounting supports 980 can be part of a single piece with the cover 920, as from a mold. Alternatively, the mounting supports 980 can be separate pieces that are mechanically coupled to the cover 920 (e.g., the side walls 926) using one or more of a number of coupling methods, including but not limited to fastening devices, welding, mating threads, and compression fittings. In certain example embodiments, the mounting supports 980 are disposed on, or are a part of, the body 930. When the mounting supports 980 are part of a single piece with the cover 920, the clamping force exerted by the fastening device 910 on the cover 920 and the body 930 can be more repeatable and reliable.

The mounting supports 980 are used to secure, and are mechanically coupled to, the lever 940. The lever 940 can include a handle 944 located at the distal end, a body 942, and a hinged coupling feature 946 at the proximal end. In certain example embodiments, the lever 940 is mechanically coupled to one or more mourning supports 980 using the hinged coupling feature 946. For example, the hinged coupling feature 946 can include a tubular aperture that traverses the length of the hinged coupling feature 946. In addition, each mounting supports 980 can include a similarly sized aperture 911 that traverses a side wall of the mounting support 980. In such a case, the hinged coupling feature 946 and the mounting supports 980 can be joined by inserting a pin (not shown, but substantially similar to the pin 211 described above with respect to FIGS. 2A-2C) into the apertures. The pin can maintain the hinged coupling between the hinged coupling feature 946 and the mounting supports 980.

In certain example embodiments, the mounting supports 980 also include other apertures that traverse a front face of the mounting supports 980. Such apertures can receive a fastener 914, which can be similar to the fastener 214 described above with respect to FIGS. 2A-2C. FIG. 9C shows that there is no wear plate, which allows for the fastener 914 to apply direct loading on the lever 940. Optionally, a wear plate can be disposed between the fastener 914 and the hinged coupling feature 946. The fastener 914, the hinged coupling feature 946, and/or the optional wear plate can be made of the same or different materials.

In certain example embodiments, the cover flange and/or the body flange is modified compared to what is shown above with respect to FIGS. 1A-1E. For example, as shown in FIG. 9A, the portion of the cover flange 922 where a bracket 948 is disposed can have a portion 923 that has a lower vertical profile (smaller height) than the rest of the cover flange 922. Similarly, the portion of the body flange 932 where a bracket 948 is disposed can have a portion 933 that has a lower vertical profile (smaller height) than the rest of the body flange 932. The portion 923 and/or the portion 933, if applicable, can be machined or otherwise disposed on the cover flange 922 and/or the body flange 932.

In cases where the cover flange 922 includes the portion 923 and/or where the body flange 932 includes the portion 933, a number of benefits can result. Examples of such benefits can include, but are not limited to, an improvement in the tolerance stack and a reduction in the potential deformation of the flame path 969 under pressure. Alternatively, the cover flange 922 and/or the body flange 932 can be without, any such portion 923 and/or 933.

In certain example embodiments, using the example fastening device 910 shown in FIGS. 9A-9C, there are no slots or other features along the perimeter of the cover flange 922 or the body flange 932 (or, as applicable, the portion 923 or the portion 933) where the bracket 948 is mechanically coupled to the cover flange 922 and the body flange 932. Alternatively, one or more of a number of features, as described above with respect to FIGS. 1A-2C, can be disposed on the cover flange 922 or the body flange 932.

The body 942 of the lever 940 have include an aperture 960 that traverses therethrough to provide a way of securing the lever 940 in the fully closed position. In addition, in certain example embodiments, the body 942 of the lever 940 can include a protruding member 961 that protrudes from the bottom surface of the body 942 and mechanically couples to a retaining feature (not shown) in the top side 950 of the bracket 948. While the brackets 948 in this example are shown without any features on the top side 950, the back side 954, or the bottom side 952, one or more features, as described above with respect to the bracket 148 of FIGS. 1A-2C above, can be disposed on and/or within the example brackets 948 of FIGS. 9A-9C.

In certain example embodiments, when hinges 970 are used to hingedly couple the cover 920 to the body 930 of the enclosure 900, the hinges 970 can be mounted outside of the brackets 948, rather than under the brackets as described above with respect to FIGS. 1A-2C. The hinges 970 can be of any configuration, shape, and/or size. For example, as shown in FIGS. 9A and 9B, the hinges 970 can be two plates (cover plate 973 and body plate 972) that are mechanically coupled to the side edge of the cover flange 922 and the body flange 932, respectively, using one or more fastening devices 974 (e.g., bolts).

The cover plate 973 and the body plate 972 of the hinge 970 can be mechanically coupled to each other in one or more of a number of ways using one or more of a number of coupling methods. For example, in this case, the cover plate 973 and the body plate 972 can be hingedly coupled to each other using a sleeve 975 that protrudes from a top portion of the body plate 972 and extends into, and is slidably received by, a slotted aperture 976 in the cover plate 973. As another example, as shown in FIGS. 9A and 9B, a pin 971 can be used to hingedly couple the cover plate 973 and the body plate 972.

Example embodiments of fastening devices for explosion-proof enclosures resist explosion and/or hydrostatic forces by maintaining a flame path where the cover flange and the body flange are coupled. Further, using the example fastening devices described herein and other embodiments of these example fastening devices allows for efficient and effective coupling and/or decoupling of the cover and the body of the explosion-proof enclosure. In addition, using example embodiments of fastening devices allows for increased flexibility with regard to where components are positioned on the cover and/or where conduit can be manually coupled to the explosion-proof enclosure. Further, using example embodiments of fastening devices for explosion-proof enclosures allows the flame path to exist within the requirements of one or more standards and/or regulations for explosion-proof enclosures.

In addition, example embodiments of fastening devices that include a bracket allow a user to create a hinged side between the cover and the body. In such a case, the bracket protects the hinge from being damaged while the bracket fastens the cover to the base. The connection of the bracket to the cover and/or the base can be adjusted by the user to allow for more flexible and convenient configurations between the cover, the base, and the brackets. Example embodiments described herein also include a number of securing features that can be used to secure the lever of the fastening device in the fully-closed position. Such securing features can require a special tool to release the lever away from the fully-closed position. Alternative, a user can use his hands to release the securing feature and allow the lever to move from the fully-closed position.

Using example fastening devices described herein also provides stress relief on the cover flange and/or the body flange by more evenly distributing the compressive force imposed by the bracket on the cover flange and the body flange. As a result there is increased contact pressure on the flame path and/or on the gasket disposed between the cover flange and the body flange. This provides enhanced safety and ingress protection. The addition of an example flange relief feature can further decrease deflection, provide for better sealing between the cover and the body, and maintain the flame path. The resulting stress relief also alters the bending moment to limit deformation of the cover and/or body, which in turn better maintains the integrity of the flame path and the gasket sealing.

Accordingly, many modifications and other embodiments set forth herein will come to mind to one skilled in the art to which fastening devices for explosion-proof enclosures pertain having the benefit of the teachings presented in the foregoing descriptions and the associated drawings. Therefore, it is to be understood that fastening devices for explosion-proof enclosures is not to be limited to the specific embodiments disclosed and that modifications and other embodiments are intended to be included within the scope of this application. Although specific terms are employed herein, they are used in a generic and descriptive sense only and not tor purposes of limitation.

What is claimed is:

1. A fastening device for fastening a cover to a body of an explosion-proof enclosure, the fastening device comprising:
   a bracket comprising a back side mechanically coupled to a bottom side at a first angle and to a top side at a second angle, wherein the top side comprises an engagement portion, wherein the first angle is configured to be substantially parallel to an under side of a flange of the explosion-proof enclosure, and wherein the second angle is configured to be substantially parallel to a top side of an opposing flange of the explosion-proof enclosure;
   a cam configured to be fixedly coupled to an outer surface of the opposing flange and hingedly coupled to the engagement portion; and
   a lever fixedly coupled to the cam and having a closed position and an open position,
   wherein the bracket is configured to engage the opposing flange and the flange when the lever is in the closed position, and
   wherein the bracket is configured to be disengaged from the opposing flange and the flange when the lever is in the open position.

2. The fastening device of claim 1, further comprising a securing device mechanically coupled to the top side of the bracket, wherein the securing device engages the lever when the lever is in the closed position.

3. The fastening device of claim 2, wherein the securing device comprises at least one detent that, when engaged, allows the lever to move into the closed position and hold the lever in the closed position.

4. The fastening device of claim 3, wherein the at least one detent is engaged by the lever when the lever moves into the closed position.

5. The fastening device of claim 3, wherein the at least one detent, when released, allows the lever to move out of the closed position.

6. The fastening device of claim 5, wherein the at least one detent is released by depressing a portion of the securing device.

7. The fastening device of claim 5, wherein the at least one detent is released by rotating a portion of the securing device.

8. The fastening device of claim 2, wherein the securing device comprises a spring clip that traverses an aperture in the lever and mechanically couples to the lever.

9. The fastening device of claim 2, wherein the securing device comprises a screw that traverses an aperture in the lever and mechanically couples to the top side of the bracket.

10. The fastening device of claim 9, wherein the screw is seated within an aperture in the lever.

11. The fastening device of claim 1, wherein the first angle is different from the second angle.

12. The fastening device of claim 1, wherein when the lever is in the closed position, a flame path is maintained between the opposing flange and the flange.

13. The fastening device of claim 1, wherein when the flange is part of the body of the explosion-proof enclosure, and wherein the opposing flange is part of the cover of the explosion-proof enclosure.

14. An enclosure comprising:
   a first enclosure portion comprising a flange;
   a second enclosure portion mechanically coupled to the first enclosure portion and comprising an opposing flange, wherein the opposing flange comprises a flange relief feature disposed along a distal end of the opposing flange and a proximal end of a normal portion of the opposing flange; and
   a fastening device mechanically coupled to an outer surface of the first enclosure portion, wherein the fastening device comprises:
      a bracket comprising a back side mechanically coupled to a bottom side at a first angle and to a top side at a second angle, wherein the top side comprises an engagement portion, wherein the first angle is substantially parallel to an under side of the opposing flange, and wherein the second angle is substantially parallel to a top side of the flange;

a cam fixedly coupled to the outer surface of the flange and hingedly coupled to the engagement portion; and a lever fixedly coupled to the cam and having a closed position and an open position, wherein the bracket engages the flange and the opposing flange when the lever is in the closed position, and wherein the bracket is disengaged from the flange and the opposing flange when the lever is in the open position.

15. The enclosure of claim 14, wherein the fastening device further comprises a securing feature mechanically coupled to the top side of the bracket, wherein the securing device engages the lever when the lever is in the closed position.

16. The enclosure of claim 14, wherein at least one selected from a group consisting of the flange and the opposing flange comprises a flange relief feature disposed continuously around a perimeter of the at least one selected from the group consisting of the flange and the opposing flange.

17. The enclosure of claim 14, wherein at least one fastening device is disposed along each side of the first enclosure portion.

18. The enclosure of claim 14, wherein the first enclosure portion is a cover, and wherein the second enclosure portion is a body.

19. An enclosure comprising:

a first enclosure portion comprising a first flange and at least one mounting support;

a second enclosure portion mechanically coupled to the first enclosure portion and comprising a second flange; and at least one fastening device mechanically coupled to the at least one mounting support, wherein the at least one fastening device comprises:

a bracket comprising a back side mechanically coupled to a bottom side at a first angle and to a top side at a second angle, wherein the top side comprises an engagement portion, wherein the first angle is substantially parallel to an under side of the first flange, and wherein the second angle is substantially parallel to a top side of the second flange;

a hinged coupling feature hingedly coupled to the at least one mounting support and fixedly coupled to the bracket; and a lever fixedly coupled to the hinged coupling feature and having a closed position and an open position, wherein the bracket engages the first flange and the second flange when the lever is in the closed position, and wherein the bracket is disengaged from the first flange and the second flange when the lever is in the open position.

20. The enclosure of claim 19, wherein the first flange comprises a first portion having a first vertical profile that is less than that of a remainder of the first flange, wherein the bracket engages the first portion of the first flange and the second flange when the lever is in the closed position, and wherein the bracket is disengaged from the first portion of the first flange and the second flange when the lever is in the open position.

21. The enclosure of claim 20, wherein the second flange comprises a second portion having a second vertical profile that is less than that of a remainder of the second flange, wherein the bracket engages the first portion and the second portion when the lever is in the closed position.

22. The enclosure of claim 19, wherein the first enclosure portion is a cover that further comprises a domed portion, wherein the at least one mounting support is disposed on the domed portion.

* * * * *